United States Patent
Cavazos

(10) Patent No.: US 9,122,755 B2
(45) Date of Patent: Sep. 1, 2015

(54) INSTANTANEOUS INCREMENTAL SEARCH USER INTERFACE

(71) Applicant: Arnaldo Cavazos, Newton Square, PA (US)

(72) Inventor: Arnaldo Cavazos, Newton Square, PA (US)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 13/776,743

(22) Filed: Feb. 26, 2013

(65) Prior Publication Data

US 2014/0244675 A1  Aug. 28, 2014

(51) Int. Cl.
*G06F 17/30* (2006.01)

(52) U.S. Cl.
CPC .... *G06F 17/30864* (2013.01); *G06F 17/30646* (2013.01); *G06F 17/30696* (2013.01); *G06F 17/30967* (2013.01)

(58) Field of Classification Search
CPC .............. G06F 17/30864; G06F 17/30867; G06F 17/30967; G06F 17/30646; G06F 17/30696
USPC ........................................................ 707/758
See application file for complete search history.

(56) References Cited

U.S. PATENT DOCUMENTS

| | | | |
|---|---|---|---|
| 5,794,233 A | 8/1998 | Rubinstein | |
| 5,875,446 A | 2/1999 | Brown et al. | |
| 6,006,225 A | 12/1999 | Bowman et al. | |
| 6,529,903 B2 | 3/2003 | Smith et al. | |
| 7,043,535 B2 | 5/2006 | Chi et al. | |
| 7,467,131 B1* | 12/2008 | Gharachorloo et al. | 1/1 |
| 7,617,236 B2 | 11/2009 | Gaurav et al. | |
| 8,036,877 B2 | 10/2011 | Treadgold et al. | |
| 8,122,034 B2 | 2/2012 | Aravamudan et al. | |
| 8,195,767 B2 | 6/2012 | Albrecht et al. | |
| 8,438,166 B1* | 5/2013 | Treder | 707/741 |
| 8,498,977 B2* | 7/2013 | Gross et al. | 707/708 |
| 8,504,437 B1 | 8/2013 | Agarwal et al. | |
| 8,527,499 B2 | 9/2013 | Beringer et al. | |
| 8,577,915 B2* | 11/2013 | Barve et al. | 707/769 |
| 8,676,828 B1* | 3/2014 | Agarwal et al. | 707/767 |
| 8,725,760 B2 | 5/2014 | Heidasch | |
| 8,768,909 B2* | 7/2014 | Carpenter et al. | 707/708 |
| 2003/0005233 A1* | 1/2003 | Stewart et al. | 711/136 |
| 2003/0088715 A1 | 5/2003 | Chaudhuri et al. | |
| 2008/0126308 A1* | 5/2008 | Wooldridge et al. | 707/3 |
| 2009/0019002 A1 | 1/2009 | Boulis | |
| 2012/0158688 A1* | 6/2012 | Ramachandran et al. | 707/706 |
| 2012/0173500 A1* | 7/2012 | Chakrabarti et al. | 707/706 |
| 2012/0239381 A1 | 9/2012 | Heidasch | |
| 2012/0296743 A1 | 11/2012 | Velipasaoglu et al. | |

(Continued)

OTHER PUBLICATIONS

Guoliang Li et al., "Effici ent Type-Ahead Search on Rel ati onal D ata: a TASTIER Approach", Jun. 29, 2009, ACM, pp. 695-706.*

*Primary Examiner* — Apu Mofiz
*Assistant Examiner* — Jared Bibbee

(57) ABSTRACT

An incremental search user interface is implemented to reduce search requests from a client system to a server system. In one aspect, a result list is cached in a memory of the client system, where the result list corresponds to a search request from the client system to the server system. In another aspect, a check is repeatedly performed, in a predetermined time interval, to determine whether an input keystroke is received. Upon confirming the receiving of an input keystroke, based on a partial query and the cached result list, determine whether a search request to the server is unnecessary.

20 Claims, 5 Drawing Sheets

(56) References Cited

U.S. PATENT DOCUMENTS

| | | | |
|---|---|---|---|
| 2012/0317097 A1* | 12/2012 | Tseng ........................... | 707/722 |
| 2013/0054563 A1 | 2/2013 | Heidasch | |
| 2013/0080611 A1* | 3/2013 | Li et al. ......................... | 709/223 |
| 2014/0114955 A1 | 4/2014 | Kulkarni et al. | |

\* cited by examiner

INSTANTANEOUS INCREMENTAL SEARCH USER INTERFACE

FIELD

Subject matter is drawn to a human-computer interface for searching data of a computer system.

BACKGROUND

Traditional information retrieval systems return search results after a submits a fully formulated search query. A system waits for the user to type the query, after which it is the user who waits the system to process the search request. With such systems, the user has little visibility into how effectively the formulated search query may locate information of interest prior to completion the processing of the query. The user guesses, beforehand, what query pattern is sufficient for the system to distinguish the desired information from other, similar information within the searched content. This information-access paradigm is referred to as "delimited search".

Delimited search is opposed to an incremental search in which as the user types the search query character by character, possible matches for the partially typed query are found and presented to the user. Incremental search is also referred to as search-as-you-type, type-ahead-search, find-as-you-type, etc. With incremental search, search query suggestions or search query results are dynamically presented potentially upon each keystroke. The incremental search provides constant feedback as to the results while the user incrementally enters the search query. Incremental searching results in an increased number of search queries generated potentially by each keystroke compared to one query per submission. The increased number of search queries may increase the system's response time as perceived by the user. The perception of increased response time may have a negative effect on user satisfaction and usability of the search interface.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for instantaneous incremental search interface are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
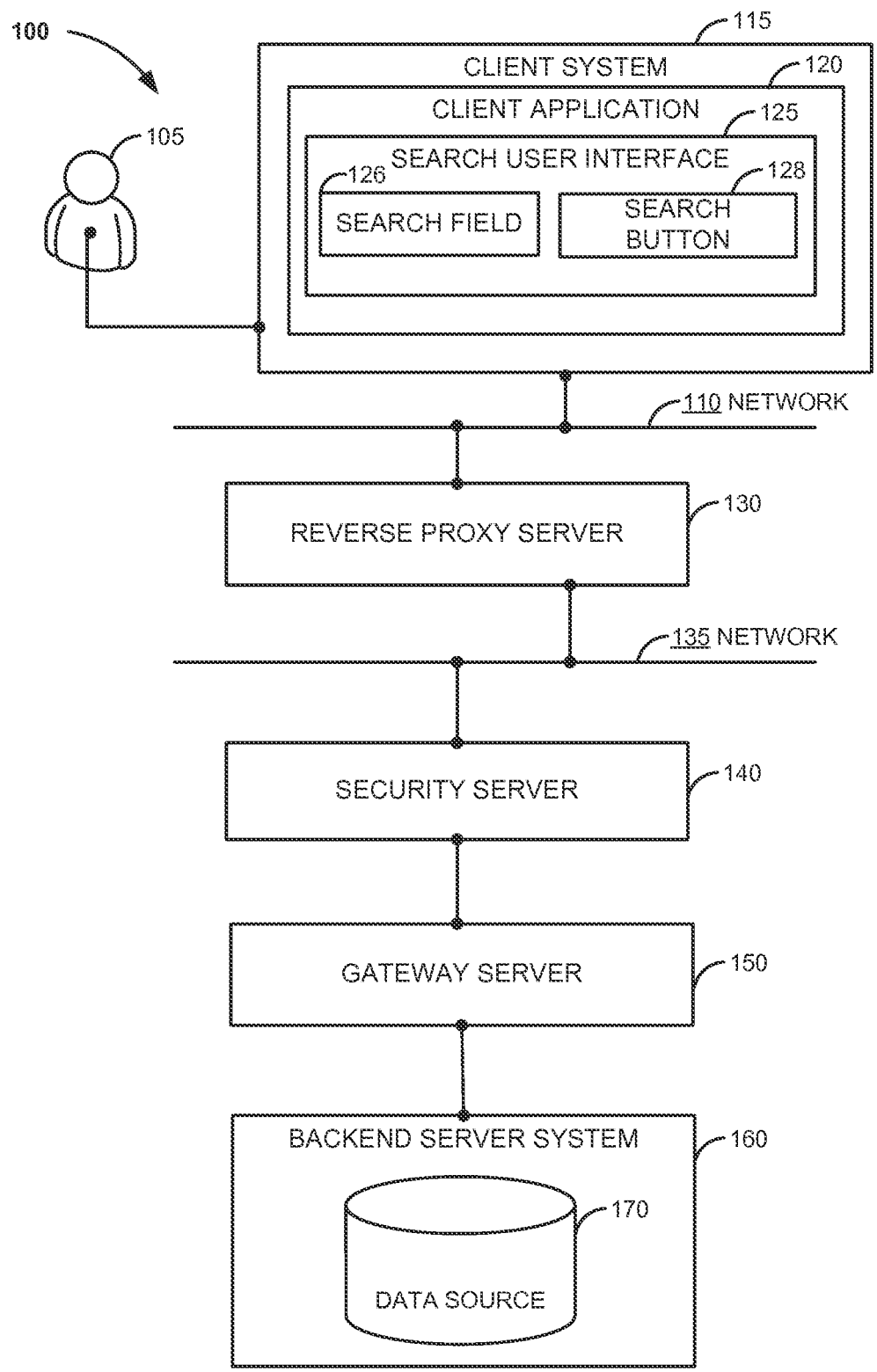
FIG. 1 is a block diagram that illustrates exemplary system architecture for searching data of an enterprise system from a client system, according to one embodiment.

FIG. 1 illustrates exemplary system architecture 100 for searching data at an enterprise system from a client system 115, according to one embodiment. User 105 may execute various operations or request different services available within client system 115 or provided by one or more server systems such as backend server system 160 via network 110. Network 110 may be the Internet, an intranet, or other public or private computer network. In one embodiment, client system 115 may be a mobile device, e.g., a tablet, a mobile phone, or any other portable or hand held device, or device with limited screen area and memory capacity. For example, the screen area or the memory capacity may be limited compared to a desktop computer, workstation, or a laptop. Client system 115 runs client application 120 to interact with backend server system 160. In one embodiment, backend server system 160 is an enterprise system such as Customer Relationship Management (CRM), Enterprise Resource Planning (ERP), Product Lifecycle Management (PLM), Supplier Relationship Management (SRM), Supply Chain Management (SCM), Human Resources (HR) system, etc.

User 105 may operate with an instance of search user interface 125. Search user interface 125 is a user interface of client application 120 for incremental searching of data. In one embodiment, search user interface 125 is operable to send search requests to backend server system 160 and to display results returned, at client application 120, in response to the requests. Search user interface 125 is operable to search enterprise data at backend server system 160. For example, data persisted in data source 170 of backend server system 160 may be queried based on the search requests. In one embodiment, backend server system 160 may have one or more data sources that are systems separate from backend server system 160.

Enterprise data may be structured data representing business information of an enterprise or other organization. The structured data may be identifiable and searchable based on the structure of a container that hosts the data Common form of structured data is a relational data source. A relational data source comprises a set of one or more tables. A table contains data about a set of entities that can be described by the same attributes. Tables comprise columns, or attributes, and rows, or records. A table contains at least one column. A column indicates an attribute that can be used to describe each of the entities. A column definition may include the attribute name, type, size restriction, default value, and in some cases all of its possible values. A row indicates the set of attribute values—one attribute value for each column in the table which describe a single entity. Structured data may be searchable by attributes of the entities. For example, by an attribute "last name" of an entity "business partner".

In one embodiment, a search request is a request for information based on a search query. A search query may be any character-based one or more keywords. Search queries may be expressed as one or more terms in a natural language. In one embodiment, the search query may be of data type "string". Search queries may be entered into search field 126, e.g., characters and symbols of the search query may be typed into field 126. A search result of a search request is an entity including data that matches or satisfies the search query based on which the request is generated.

In one embodiment, search user interface 125 provides search results based on partially entered search query. The search results are provided incrementally upon entering keystrokes, e.g., as the user is typing the search query character by character. To illustrate with an example, user 105 of client system 115, such as a mobile phone, may be looking up business partners by typing last names in search field 126. User 105 may intent to search for "John Doe" and, thus, the user types in "d". Upon entering character "d" a list of business partners such as "Fred Daniels", "Elizabeth Daughetry", "John Denver", etc., may be instantaneously displayed, for example, within no more than a second. Next, user 105 may continue by typing "o" and the results are updated by showing business partners whose last name begin with "Do", such as "Hank Doane" "John Doe", "Mickey Donnoly", etc. Already, the business partner searched for is displayed in the list with returned results. At this point, instead of completing the full last name, user 105 may directly select the desired business partner.

The incremental search provides results while the user incrementally enters the search query. Thus, as the user is typing relevant results are returned and displayed. The user can glance over the results while typing. The content relevant to the user may be received potentially faster compared to a delimited search because the user may receive desired information without finishing typing a full search term, or without additional manual actions such as pressing a search button. The answer searched for may be displayed before the query is completely entered. Further, the user may explore displayed results while typing, backspacing and retyping, thus adjusting and improving the search strategy based on the results that are dynamically presented.

Typically, incremental searching generates higher number of search requests to a data source compared to one request to the source per one query submission, e.g., upon submitting a search request by the user via a search button. For example, an incremental search user interface 125 may potentially generate a request to backend server system 160 upon each keystroke. In an enterprise system environment such as computer system 100, increase in the number of requests sent to backend server system 160 may increase the response time.

In a system environment, before a search request reaches the target data source (e.g., data source 170), the request may be processed by various other systems. For example, requests may be processed by reverse proxy server 130 which is a type of proxy server that retrieves resources on behalf of client application 120 from one or more servers such as backend server system 160. These resources are then returned to client application 120 as if they originated from backend server system 160 itself. Reverse proxy server 130 acts as an intermediary for one or more associated servers and returns data provided by those associated servers. Then, the search requests may be processed by security server 140 which may provide functionality for user on-boarding, user authentication, distribution of security certificates, etc. In one embodiment, reverse proxy server 130 and security server 140 may communicate via network 135 such as an enterprise intranet network. The search requests may then be also processed by a gateway server 150 which is an interface that exposes backend services of backend server system 160 to consumer applications such as client application 120. Gateway server 150 may be designed based on Representational State Transfer (REST) architecture. Gateway server 150 permits business data content of one or more systems such as backend server system 160 to be accessible as REST resources through a uniform, stateless interface to any software system that can communicate based on Hypertext Transfer Protocol (HTTP) and can interpret Extensible Markup Language (XML) or JavaScript Object Notation (NON) based messages One example of such gateway server system may be SAP NetWeaver® Gateway.

Once the search request is processed by reverse proxy server 130, security server 140, and gateway server 150, the request reaches backend server system 160. In response to the search request, data source 170 is queried based on the search query and respective results are retrieved. Then, the retrieved results may be processed by backend server system 160, gateway server 150, security server 140, reverse proxy server 130, until the results are provided to client application 120 and displayed on a graphical user interface (GUI) of search user interface 125.

Processing search requests by various systems that are typical for an enterprise system environment may increase the response time to the search requests. For example, user 105 may have to wait on each keystroke. Also, triggering a search request potentially upon each keystroke may generate additional load at backend server system 160 that in turn may also increase the response time for processing the requests. In order to simulate instantaneous retrieval and display of search results, the number of search requests sent to a data source may be minimized.

In one embodiment, it is possible to present data to user 105 in response to entering a search query without actually sending a search request to backend server system 160. For example, user 105 may be looking up business partners whose last name begin with 'Yi'. User 105 may type a "y", and a request to backend server system 160 is sent, it could be that there are no business partners whose last names begin with "y", in such case no results are returned. Then, user 105 types an "i" to determine whether there are business partners whose last name begins with "yi". Another search request based on search query "yi" is unnecessary, because if there is no business partner whose last name begins with "y", also there is no business partner whose last name begins with "yi". To limit and reduce the number of search requests that are sent to backend server system 160, a method to determine whether a search request is unnecessary is implemented.

Smart Caching to Reduce Search Requests to a Backend Server

Figure 2:
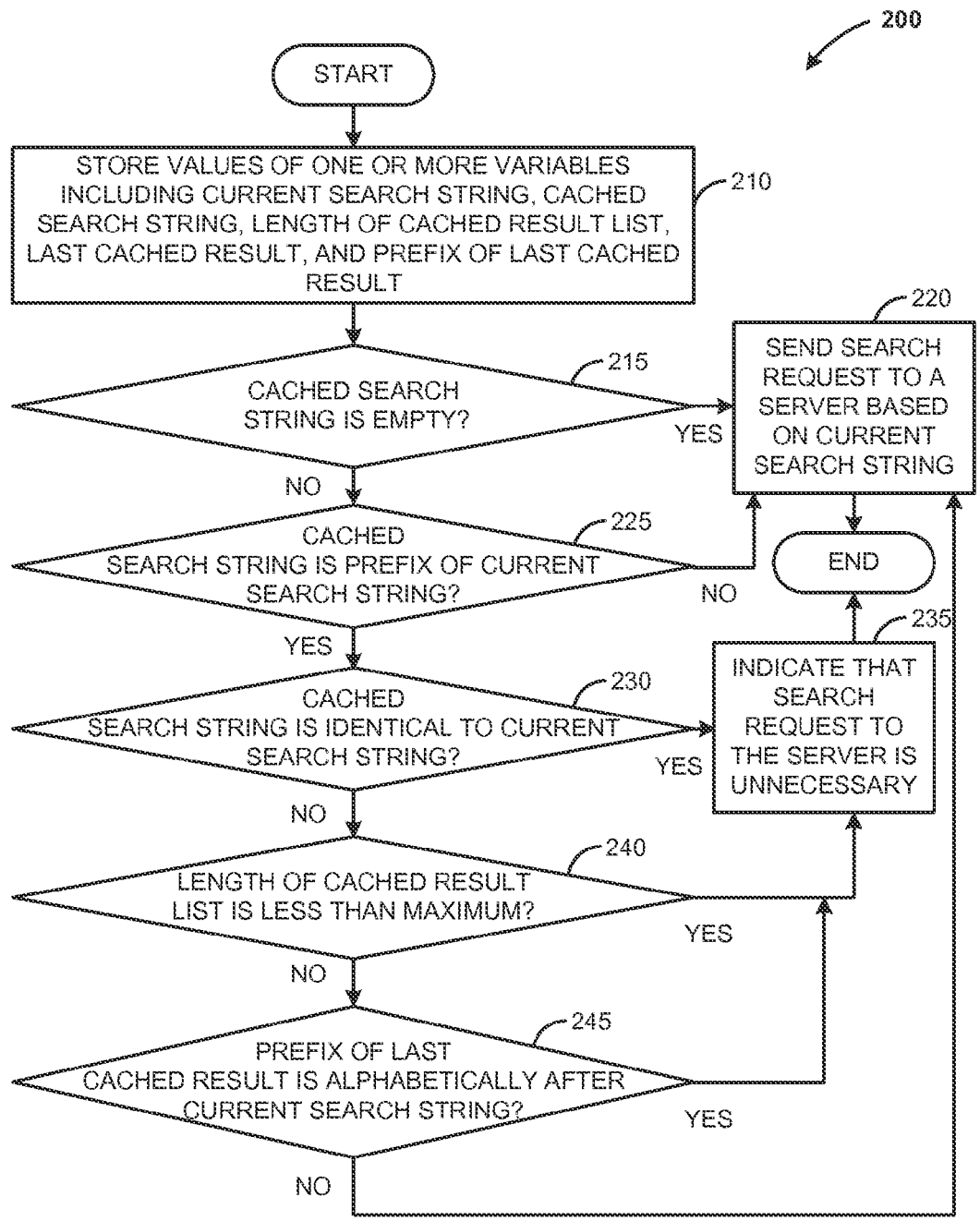
FIG. 2 is a flow diagram that illustrates a process to determine, upon receiving an input keystroke, whether a search request to a server is unnecessary, according to one embodiment.

FIG. 2 illustrates process 200 to determine, upon receiving an input keystroke, whether a search request to a server is unnecessary, according to one embodiment. Upon receiving an input keystroke of a partial search query, at 210, values of one or more variables, if available, are stored, including values for a current search string, a cached search string, a length of a cached result list, a last cached result, and a prefix of the last cached result. In one embodiment, a prefix of a first cached result may also be stored. The current search string represents a search query most recently typed or currently entered. The cached search string represents a search query typed prior the current search string for which cached search string results are returned and cached at the client system. For example, if a user types an "s", and a list of results based on search query "s" are retrieved and cached and the user continues to type by entering an "m", then, the value of the current search string is "sm", and the value of the cached search string is "s". The cached search string represents a previous search query to the current search query.

In one embodiment, the one or more variables are stored in a cache or other storage of the client system from which system search requests are sent. Further, a list of results that are retrieved based on the cached search string is also stored in the cache, i.e., a cached result list. In one embodiment, results in the cached result list are ordered in a sequence, for example, alphabetically. The last cached result is the last result in the alphabetical sequence of results in the cached result list. For example, if a user types "s", and a list of 50 results are returned and cached, where the first result in the list is "Samson" and the last result in the list is "Sutherland", then the last cached result is "Sutherland". The first cached result is the first result in the alphabetical sequence of results in the cached result list.

A prefix of a last cached result represents the initial one or more characters of the string representing the last cached result, where the initial characters are equal in length to the number of characters of the current search string. Thus, the prefix of the last cached result consists of an equal number of symbols as the current search string. For example, if a user types an "s" for which results are cached, and then "w", and the last cached result is "Sutherland", then cached search string equals "s", the current search string equals "sw", and the prefix of last cached result equals "su", e.g., the first two characters from "Sutherland". An exception where the prefix of the last cached result does not consist of an equal number of symbols as the current search string is when the current search string is greater in length than the last cached result, e.g., where the current search string consists of more symbols than the last cached result. In such case, the prefix of the last cached result is identical to the last cached result itself. For example, if a user types "k" upon which a search request to a backend server system is triggered and responded with a result list for the search query "k". Then, the user types "os", and thus the current search string is "kos"'. If the last cached result of the list of results for search query "k" is a last name "Ko", then "Ko" is shorter in length than "kos". Thus, the prefix of the last cached result and the last cached result itself is "ko". Therefore, a prefix of a last cached result is either equal in length to a current search string or, if the current search string is longer than the last cached result, the prefix of the last cached result is the last cached result itself.

A prefix of a first cached result represents the initial one or more characters of the string representing the first cached result, where the initial characters are equal in length to the number of characters of the current search string. Thus, in one embodiment, the prefix of the last cached result consists of an equal number of symbols as the current search string. In one embodiment, a prefix of a first cached result is either equal in length to a current search string or, if the current search string is longer than the first cached result, the prefix of the first cached result is the first cached result itself.

The length of the cached result list represents the number of search results included in the cached result list. For example, 10 business partners may be returned as results based on the cached search string. Hence, the length of the cached result list equals 10. In one embodiment, a value of a threshold that specifies a maximum number of search results that are permitted to be cached at the client system is also stored. For example, in case the client system is a mobile device with limited storage capacity, a limit on the size of the results that can be cached is defined. Another reason for limiting the total number of results that can be cached at the client system is that it may be uncommon or inconvenient for users to scroll through high number of search results because it is time consuming. A more typical scenario may be that a user rather further specifies the search query instead of scanning through many results. Thus, to improve user experience the total number of results that may be returned and displayed at the client system may be limited, for example, the maximum number of results permitted to be returned to the client may be 50.

At 215, a check is performed to determine if the cached search string is empty or blank, e.g., if no value is stored for the cached search string. The cached search string may be empty if no search request is yet triggered and responded to. For example, cached search string may be empty if the received input keystroke is a first inputted character of the partial search query. Cached search string may also be empty if the cache of the client is cleared. If there is no value stored for the cached search string, then no results are cached on the client system. If the cached search sting is empty, at 220, a search request based on the current search string is sent to a server system to retrieve results for the partial search query and process 200 ends.

If the cached search string is not empty another check is used to determine whether a search request, based on the current search string, to the server system is necessary. When the cached search string is not empty, a result list based on the cached search string of the partial query is stored in the cache. In one embodiment, a search request may be necessary in case there is a probability that the cached result list does not include a result that matches the current search string. At 225, a check is performed to determine if the cached search string is a prefix of the current search string. If the cached search string is not a prefix of the current search string, a search request based on the current search string is sent to the server system and process 200 ends. The cached search string may not be a prefix of the current search string if, for example, the user backspaces to replace the last one or more characters of the partial search query. For example, the user may type search query "sw" that represents the cached search string, and then, backspaces once and types "u" to replace "w", e.g., to correct a typo. Thus, the cached search string "sw" is not a prefix of the current search string "su" and a search request to the server system based on "su" is sent.

If the cached search string is a prefix of the current search string, a check is performed to determine whether a search request to the server system is unnecessary. In one embodiment, a search request to the server may be unnecessary when matches or results to the current search string can be retrieved from the cached result list. At 230, a check is performed to determine if the cached search string is identical to the current search string. For example, the user may search a business partner with last name "Samson". Characters "sa" may be already typed, and stored as the cached search string. The results of the cached search string are also cached. Then, the user may type "n" instead of "m". The user may quickly backspace, before a response to a search request for the string "san" is received, if a request for "san" has been triggered. In such case, after removing character "n" the current search string is again "sa" and is identical to the cached search string, although keystroke input is received. One string is identical to another string in case the symbols of both strings are identical or alphabetically equal, and also the symbols are in the same order in both strings. In one embodiment, even if case of the symbols, lowercase or uppercase, does not match, the strings may still be considered to be alphabetically equal or identical. If the current search string is identical to the cached search string, at 235, it is indicated that a search request, based on the current search string, to the server is unnecessary and process

200 ends. Results retrieved based on the same search query as the current search string are already cached at the client system. In the case where the cached search string is identical to the current search string, commonly the user either enters more characters to further specify the search query or the user is finished typing, for example, the user may press the search button or select one of the listed results.

If the current search string is not identical to the cached search string, another check is performed to determine whether a search request to the server system is unnecessary. At 240, a check is performed to determine whether the length of the cached result list is less than a maximum. For example, it is checked if the length of the cached result list is below a value of the threshold that specifies the maximum total number of search results that are permitted to be cached at the client system. At this stage, it is already determined that the cached search string is not empty and results retrieved based on the cached search string are stored as the cached result list. Also, it is determined that the cached search string is a prefix of the current search string, but not identical to the current search string. Hence, the current search string may further narrow down or specify the cached search string, e.g., the user may have appended additional one or more characters to the search query represented by cached search string. For example, the cached search string may be "sa" and the current search string may be "sam".

If the length of the cached result list is less than the maximum, then the cached result list includes all available matches of the cached search string. There are no results that are excluded from the cached result list because the cached result list does not exceed the maximum number of total results permitted to be cached. For example, the cached result list includes all business partners available at the data source whose last name start with "sa". In such a case, the cached result list also includes all available matches of the current search string, e.g., "sam". If the cached result list includes all business partners available at the data source whose last name starts with "sa", then it also includes all business partners whose last name starts with "sam". If the length of the cached result list is less than the maximum, it is determined that the cached result list already includes matches to the current search string and a search request to the server, based on the current search string, is unnecessary and process 200 ends.

If the length of the cached result list is not less than the maximum, it is concluded that the total number of matches to the cached search string that are available at the sever system may not be determined or estimated. There may be more results available that are not returned and cached at the client system. Thus, another check is performed to determine whether a search request to the server system is unnecessary. At 245, a check is performed to determine if the prefix of the last cached result is alphabetically after the current search string. In one embodiment, if two search strings that include numbers are compared, the increasing order of the numbers is compared to determine if one string is alphabetically after or before the other. If the prefix of the last cached result is alphabetically after the current search string, then possible matches of the current search string are already available at the cached results list. Thus, search request to the server is unnecessary and process 200 ends. If the prefix of the last cached result is not alphabetically after the current search string, then a search request based on the current search string is sent to the server.

If the prefix of the last cached result is not alphabetically after, it is determined that more results may be available that are not returned and cached at the client system or that the total number of results that match the current search string are equal to the maximum number of results that are permitted to be cached. If the prefix of the last cached result is equal to the current search string, then it is possible that matches for the current search string may be excluded from the cached result list because the threshold is exceeded. For example, the user may be looking up for a business partner with last name "Simson", and the current search string may be "sim". The last cached result may be "Simpson" and, thus the prefix "sim" of the last cached result "Simpson" is equal to the current search. Because the prefix of the last cached result is equal to the current search string, more results that match the current search string and are alphabetically after the last cached result may be available, but not cached. For example, the result "Simson" that match the query "sim" is alphabetically after the last result "Simpson" and may be excluded because of exceeded threshold.

At this stage, if the prefix of the last cached result is equal to the current search string, it is concluded that possible matches for the current search string "sim" that are available at the server system, may be excluded from the cached result list. In such case the prefix of the last cached result is not alphabetically after the current search string, thus it is determined that a search request to the server is necessary and process 200 ends. Likewise, if current search string is longer than the last cached result and, thus, the prefix of the last cached result is the last cached result itself, then the last cached result is not alphabetically after the current search string, and thus, it is determined that a search request to the server is necessary and process 200 ends. In one embodiment, instead of sending a search request based on the current search string, more keystrokes have to be inputted, so that the partial search query is further specified, e.g., by further completing the partial search query. For example, such scenario may be common if few characters are entered and the characters are insufficient to effectively locate desired information. In one embodiment, it may be indicated to the user that more characters are expected to be inputted.

In one embodiment, if the prefix of the last cached result is equal to the current search string and if the number of search results exceeds the threshold, another check may be performed, in such case, a prefix of the first cached result may be compared to the prefix of the last cached result. If the prefix of the first cached result is alphabetically equal to the prefix of the last cached result, which is equal to the current search string, the user may request that more results are returned and displayed at the client system, e.g., by scrolling down. For example, if the user is looking up for a business partner with last name "Smith" and has typed "sm" as the current search string, if the threshold equals 100, and there are 500 business partners available at the server system whose last name is or begins with "Smith", then the user may request to retrieve matching results that are not displayed, but are available at the sever. Such scenario is possible, for example, when there are numerous identical matches to the partial search query, for example, numerous business partners with last name "Smith". In one embodiment, process 200 prevents sending search requests to a backend server system by identifying cases where such requests, based on the current search string, are unnecessary for retrieving results matching the current search query. In cases where process 200 determines that a search request to the server is unnecessary, no additional network traffic and load to the server system are generated. Further, the response time is also reduced and the search speeds up because instead of waiting for a search request to be processed by the server system, matches that are cached at the client system may be instantaneously displayed to the user. Thus, a better user experience may be achieved. In one embodiment, in terms of algorithms complexity, the running or processing time of process 200 is constant, e.g., O(1).

Wait Loop to Throttle Search Requests

Figure 3:
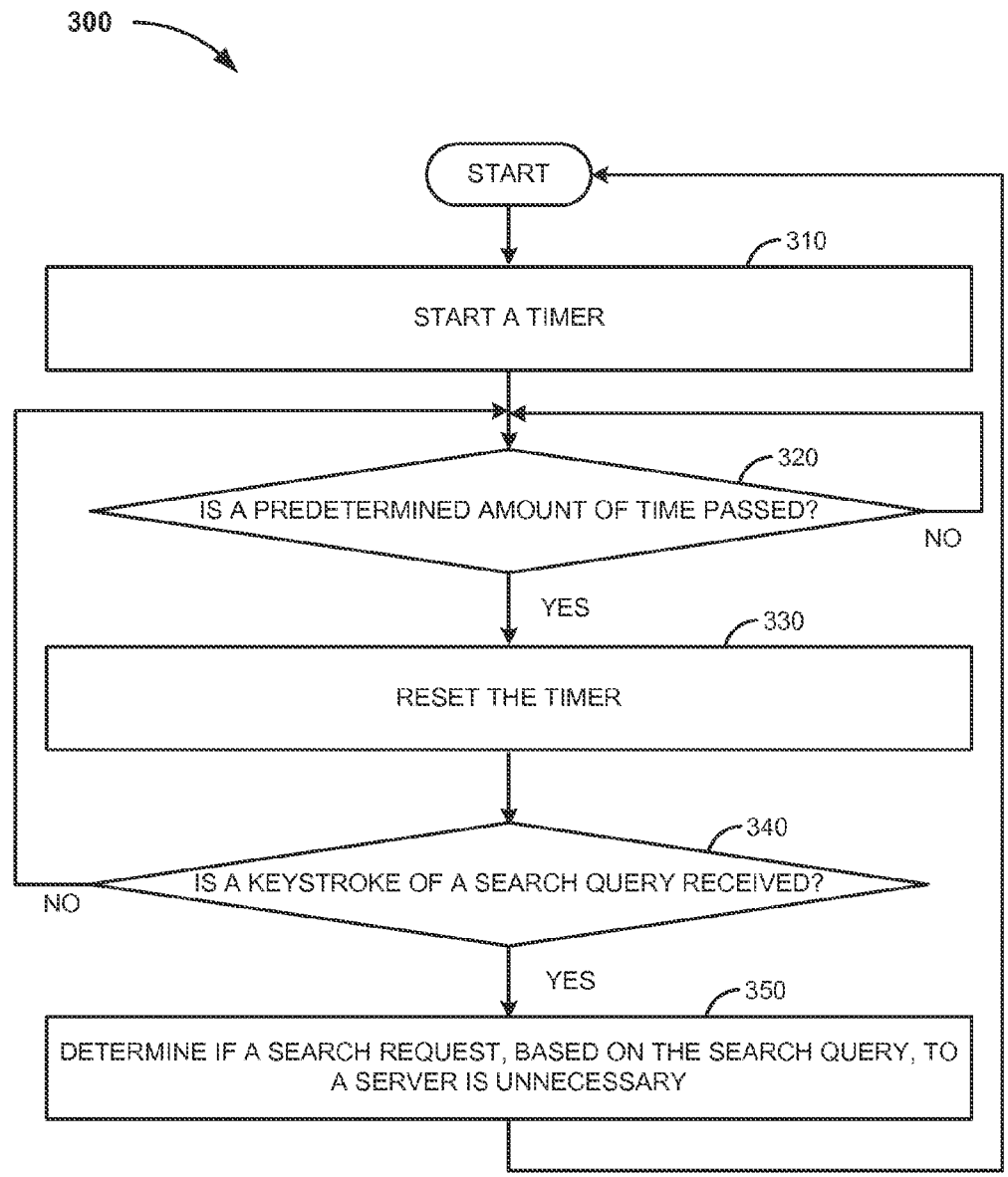
FIG. 3 is a flow diagram that illustrates a process to repeatedly check, in a predetermined time interval, whether an input keystroke is received, according to one embodiment.

FIG. 3 illustrates process 300 to repeatedly check, in a predetermined time interval, whether an input keystroke is received. In one embodiment, process 300 represents a wait loop on a client application (e.g., client application 120 in FIG. 1) that checks in a predetermined time interval, for example an interval of 0.25 seconds, whether a user has inputted any keystrokes.

At 310, a check is performed to determine if a predetermined amount of time has passed. In one embodiment, upon starting the client application, process 300 is started and is running while the client application is also running. At 310, a timer that keeps track of time elapsed is started. The check at 320 is repeated until the predetermined amount of time passes. In one embodiment, predetermined amount of time may be any time interval within one second, for example, a quarter or half a second. Upon passage of the predetermined amount of time, at 320, the timer is reset. At 330, a check is performed to determine if a keystroke of a search query is received. The search query may be partial, e.g., a search term is not fully completed. The search query may also be complete. If an input of a keystroke is not received, it is check if the predetermined amount of time has passed.

If a keystroke of a search query is received, at 340, it is determined if a search request to a server is unnecessary, where the search request is based on the search query. In one embodiment, process 200 is executed to determine whether a search request to the server is unnecessary. Process 300 repeatedly and continuously is executed until, for example, the client application is stopped.

Process 300 throttles search requests, for example, requests are limited to be generated upon passage of the pre-determined time interval and in case a keystroke is received within that time interval, instead of generating a search request upon each received keystroke. Nonetheless that requests are generated upon passage of certain amount time, a user's perception may be that results are retrieved instantaneously. For example, users cannot distinguish a delay of a quarter of a second in displaying results upon entering a keystroke.

Handling Out-of-Order Requests

Figure 4:
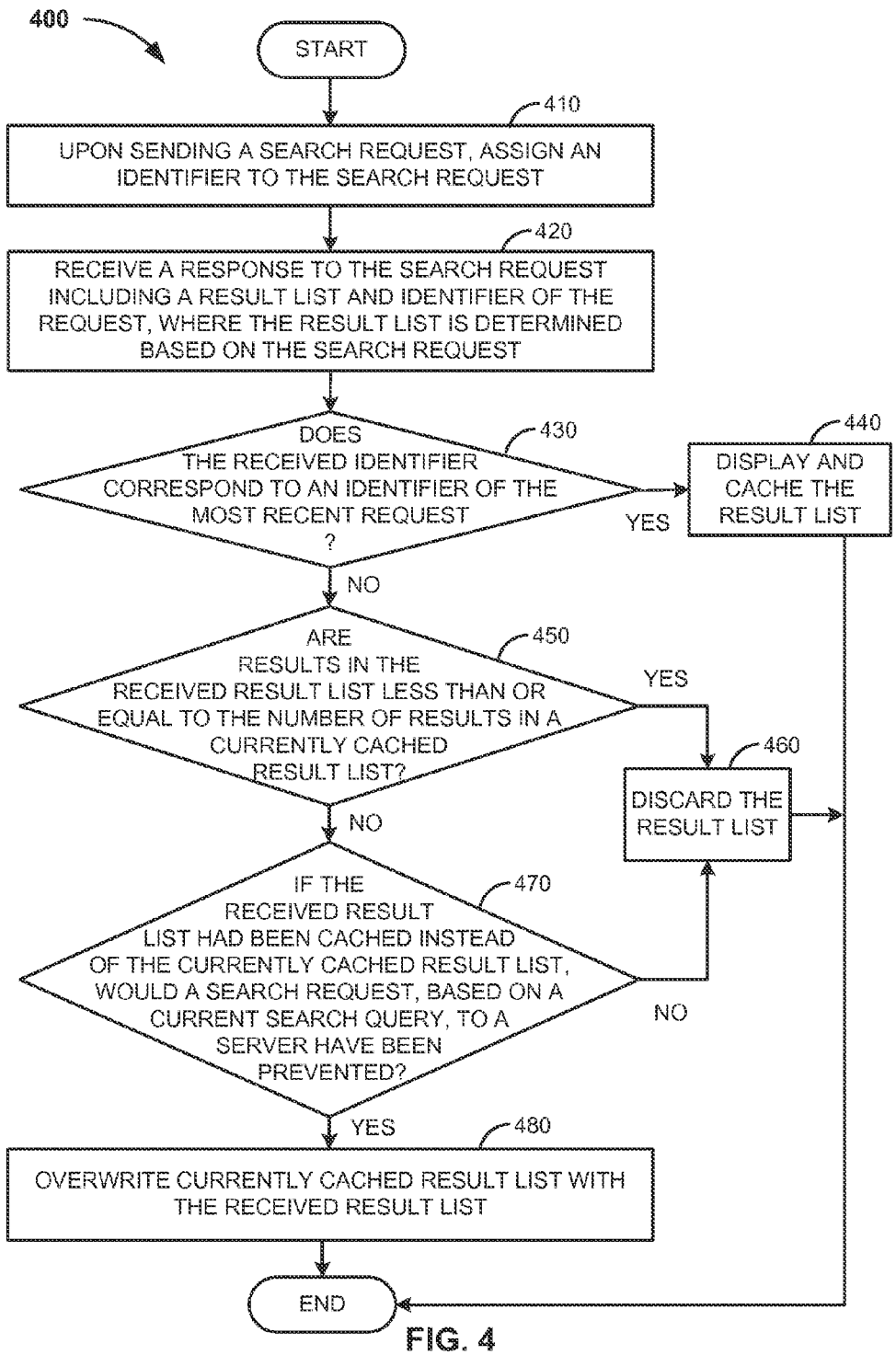
FIG. 4 is a flow diagram that illustrates a process to cache result lists of late responses that are larger than a currently cached result list and that may prevent a search request from a client to a server, according to one embodiment.

In one embodiment, search requests generated by the incremental search user interface are processed asynchronously. For example, keystrokes may be continuously inputted even if a request is sent, or even if a request is sent, but it is not responded to. Asynchronous processing may result in out of order processing of and responding to the search requests. In such a case, a search interface may display results in non-working order. For example, if a user inputs an "s", then an "u", and both keystrokes generate a search request to a backend server system, one request for business partners whose last name begin with "s", and one request for business partners whose last name begin with "su". If 100 results are returned for the search query "s", and only 2 results for the search query "su", it is possible that the smaller in size result list is returned to the search interface faster because of the smaller size. This may be problematic because when the bigger in size result list is returned to the search interface it will overwrite the first result list. Thus, results of the first query "s" may be displayed as results of the second query "su". In one embodiment, a method to discard late responses to search requests is implemented. A response is determined based on a search request and includes results of the search request. A late response is a response of an out-of-order request that includes a result list that is no longer relevant to the search query FIG. 4 illustrates process 400 to cache result lists of late responses that are larger than a currently cached result list and that may prevent a search request from a client to a server, according to one embodiment. At 410, a unique identifier is assigned to a search request, upon sending the search request. In one embodiment, the identifier is unique and assigned to each search request. The unique identifier is recorded, upon sending the request from a client system to a backend server system.

At 420, a response to the search request including a result list and the identifier of the search request are received, where the result list is determined based on the search request. To match the search request to a corresponding result list of the search request, the unique identifier of the request is returned along with the response to the request. The response is received at an incremental search user interface of the client system. The result list is retrieved from the backend server system.

At 430, a check is performed to determine if the received identifier corresponds to an identifier of the most recent request, if the received identifier corresponds to the identifier of the most recent search request, the response is a response to the most recent search request and, at 440, the received result list is displayed and cached, and process 400 ends. The result list may be displayed on a GUI of the incremental search interface.

If the response is not a response to the most recent search request, then it is determined that the response is returned out of order. In such case, at 450, a check is performed to determine if the number of results in the received result list are less than or equal to the number of results in a currently cached result list, e.g., a result list that is cached at the client system and is based on a cached search string. If the number of results in the received result list is less than or equal number to the number of the currently cached results, then the cached result list may be larger in size and more exhaustive than the received result list. Thus, to maintain a result list in the cache that is as large as possible, result lists returned out of order that are smaller or equal in size are discarded at 460.

In one embodiment, process 200 may prevent search requests to a backend system based on cached results of a search string previous to a current search string of a search query. A list of results that is as large as possible is maintained in the cache to increase chance that the cached result list includes matches of the current search string. In other words, a result list that is as large as possible within a threshold and as large as possible among result lists that are received at the client system is maintained in the cache, where the result list includes results that match a current search string. The threshold represents a maximum number of search results that are permitted to be cached at the client. Thus, by overwriting a currently cached result list with result lists of late responses that are larger than the currently cached result list, a result list that is as large as possible is maintained in the cache and search requests to the server system may be reduced. A larger cached result list is more likely to prevent a search request than the smaller cached result list.

If the number of results in the received result list is greater than the number of results in the cached result list, or there are no results cached, at 470, a check is performed to determine whether a search request, based on a current search query, to a server system would have been prevented, if the received result list had been cached instead of the currently cached result list. In one embodiment, to determine whether a search request would have been prevented, if the received result list had been cached, process 200 is performed with the received result list as the cached result list and with the most recent search string as the current search string. Then, if process 200 indicates that a search request to the server would have been unnecessary, at 480, the currently cached result list is overwritten with the received result list and process 400 ends. For example, if the newly received result list would have prevented a search request to the backend system, if it had already been cached at the client system, the old cached result list is discarded and the newly received out of order result becomes the new cached result list.

Process 400 either caches result lists of most recent search requests or caches result lists of late responses that are larger than a currently cached result list and that may prevent a search request from a client to a server system. Thus, in one embodiment, process 400 maintains a result list in the cache that is as large as possible and that may prevent search requests to the backend system. In the example in which a user types "s", then "u", and results of the "su" search query are returned first, if the user sees the results and backspaces because the user meant to type "sw", immediately upon backspacing, results beginning with "s" are instantaneously displayed. The results are instantaneously displayed because the out-of-order result list for query "s" is cached when it is received out-of-order.

Faux Search Button

In traditional delimited search interfaces a search is triggered manually by the user, for example, a search request may be submitted by pressing a search button. Therefore, there may be an expectation of users for a GUI control with which searches may be invoked. With incremental searching, searches are invoked upon receiving keystrokes. If incremental searching is combined with searching invoked via a GUI control, defects may be manifested, for example, results may be displayed out of order. In one embodiment, a non-functional GUI control for searching is implemented (e.g., search button 128 in FIG. 1). User experience of fast response time may be created by providing a non-functional search button. Upon clicking on the non-functional search button, the clicking may be visually indicated without invoking a search, e.g., without sending a search request to a server system (e.g., backend server system 160 in FIG. 1). The search button may be on-screen control that although it is enabled, it does not perform its regular function. Instead, for example, by pressing the non-functional search button, an on-screen keyboard of a client system (e.g., client system 115 in FIG. 1) such as a mobile device may be minimized to visually signal the user that the search button is successfully pressed. From the perspective of the user, response time of the search user interface is reduced and sped up. By the time the user reaches and presses the search button, a search request may already have been sent to the backend server system and has been responded to with results returned to client system. Thus, the user may perceive that results to the search request are returned and displayed instantaneously upon pressing the non-functional search button.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, tower level languages and the like. They may be linked to other components via various application programming interfaces and then compiled into one complete application for a server or a client. Alternatively, the components maybe be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term. "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
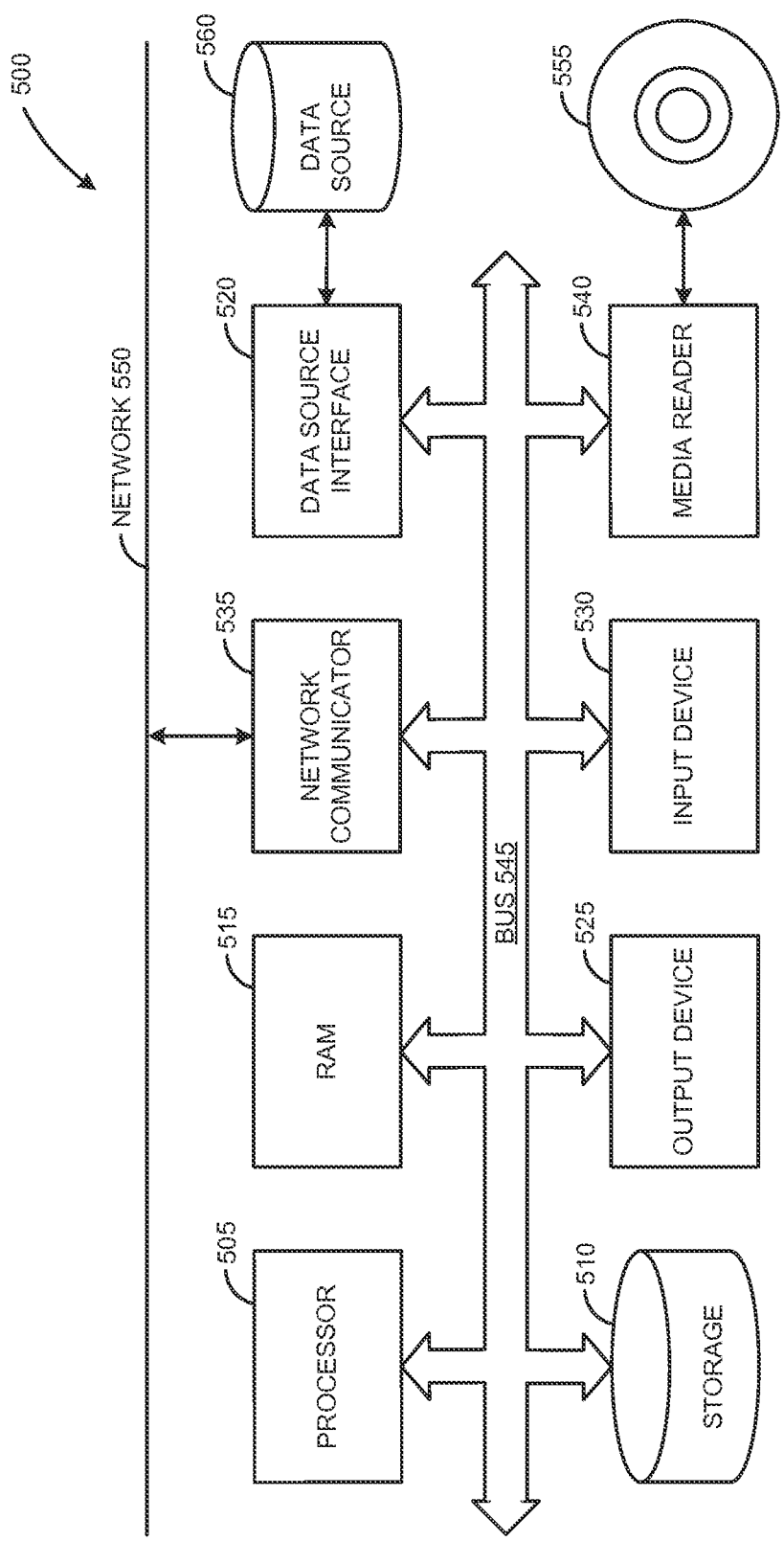
FIG. 5 is a block diagram that illustrates an exemplary computer system.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource, Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like, Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc, in other instances, well-known operations or structures are not shown or described in details.

Although the processes illustrated and described herein include series of steps, it will be appreciated that the different embodiments are not limited by the illustrated ordering of steps, as some steps may occur in different orders, sonic concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to reduce search requests from a client system to a server system, the method comprising:
   caching by a processor in a memory of the client system a result list corresponding to a search request from the client system to the server system;
   repeatedly, at a predetermined time interval, checking whether an input keystroke is received; and
   upon passage of the pre-determined time interval and upon confirming a receiving of at least one input keystroke within the predetermined time interval, based on a partial query that includes the at least one keystroke and the cached result list, determining whether a search request to the server system is unnecessary by:
      determining whether the cached search string is different from a current search string;
      upon determining that the cached search string is different from the current search string, determining whether the cached search string is a prefix of the current search string;
      upon determining that the cached search string is a prefix of the current search string, determining whether results of the cached result list are less in number than a predefined threshold, wherein the predefined threshold specifies a maximum number of search results that are permitted to be cached at the client system; and
      upon determining that the results of the cached result list are less in number than the threshold, indicating that the search request to the server system is unnecessary.

2. The method of claim 1, the method comprising:
   upon clicking on a non-functional search button, visually indicating the clicking without invoking a search.

3. The method of claim 1, wherein determining whether a search request to the server system is unnecessary further comprises:
   upon determining that a cached search string is a prefix of a current search string, determining if the cached search string is identical to the current search string, and
   upon determining that the cached search string is identical to the current search string, indicating that a search request to the server system is unnecessary.

4. The method of claim 1, wherein determining whether a search request to the server system is unnecessary further comprises:
   upon determining that the results of the cached result list are less in number than the threshold, indicating that a search request to the server system is unnecessary.

5. The method of claim 1, wherein determining whether a search request to the server system is unnecessary further comprises:
   upon determining that a cached search string is a prefix of a current search string, and that the cached search string is different from the current search string, and that results of the cached result list are not less than a predefined threshold, determining if a prefix of a last cached result is alphabetically after the current search string, and
   upon determining that the prefix of the last cached result is alphabetically after the current search string, indicating that a search request to the server system is unnecessary.

6. The method of claim 1 further comprising:
   maintaining in the cache a result list that is as large as possible within a threshold and as large as possible among result lists that are received at the client system, wherein the result list includes results that match a current search string, and wherein the threshold represents a maximum number of search results that are permitted to be cached at the client.

7. The method of claim 1 further comprising:
receiving a late response to a search request including a result list determined based on the search request, wherein results of the result list are more than results of the cached result list, and
upon determining that the received result list prevents a search request from the client system to the server system, overwriting the cached result list with the received result list.

8. A computer system to reduce search requests from a client system to a server system, the system including:
a memory to store computer executable instructions; and
a processor coupled to the memory to execute the instructions to:
caching by a processor in a memory of the client system a result list corresponding to a search request from the client system to the server system;
repeatedly, at a predetermined time interval, checking whether an input keystroke is received; and
upon passage of the pre-determined time interval and upon confirming a receiving of at least one input keystroke within the predetermined time interval, based on a partial query that includes the at least one keystroke and the cached result list, determining whether a search request to the server system is unnecessary by:
determining whether the cached search string is different from a current search string;
upon determining that the cached search string is different from the current search string, determining whether a cached search string is a prefix of a current search string;
upon determining that the cached search string is a prefix of the current search string, determining whether results of the cached result list are less in number than a predefined threshold, wherein the predefined threshold specifies a maximum number of search results that are permitted to be cached at the client system; and
upon determining that the results of the cached result list are less in number than the threshold, indicating that a search request to the server system is unnecessary.

9. The computer system of claim 8 further to:
upon clicking on a non-functional search button, visually indicate the clicking without invoking a search.

10. The computer system of claim 8, wherein determining whether a search request to the server system is unnecessary further comprises:
upon determining that a cached search string is a prefix of a current search string, determine if the cached search string is identical to the current search string, and
upon determining that the cached search string is identical to the current search string, indicating that a search request to the server system is unnecessary.

11. The computer system of claim 8, wherein determining whether a search request to the server system is unnecessary further comprises:
upon determining that the results of the cached result list are less in number than the threshold, indicate that a search request to the server system is unnecessary.

12. The computer system of claim 8, wherein determining whether a search request to the server system is unnecessary further comprises:

upon determining that a cached search string is a prefix of a current search string, and that the cached search string is different from the current search string, and that results of the cached result list are not less than a predefined threshold, determine if a prefix of a last cached result is alphabetically after the current search string, and
upon determining that the prefix of the last cached result is alphabetically after the current search string, indicating that a search request to the server system is unnecessary.

13. The computer system of claim 8 further to:
maintain in the cache a result list that is as large as possible within a threshold and as large as possible among result lists that are received at the client system, wherein the result list includes results that match a current search string, and wherein the threshold represents a maximum number of search results that are permitted to be cached at the client system.

14. The computer system of claim 8, further to:
receive a late response to a search request along with a result list determined based on the search request, wherein results of the result list are more than results of the cached result list, and
upon determining that the received result list prevents a search request from the client system to the server system, overwrite the cached result list with the received result list.

15. A non-transitory computer readable medium storing instructions thereon, which when executed by a processor cause a computer system to:
caching by a processor in a memory of a client system a result list corresponding to a search request from the client system to a server system;
repeatedly, in a predetermined time interval, checking whether an input keystroke is received;
upon passage of the pre-determined time interval and upon confirming a receiving of at least one input keystroke within the predetermined time interval, based on a partial query that includes the at least one keystroke and the cached result list, determining whether a search request to the server system is unnecessary by:
determining whether the cached search string is different from a current search string;
upon determining that the cached search string is different from the current search string, determining whether a cached search string is a prefix of a current search string;
upon determining that the cached search string is a prefix of the current search string, determining whether results of the cached result list are less in number than a predefined threshold, wherein the predefined threshold specifies a maximum number of search results that are permitted to be cached at the client system; and
upon determining that the results of the cached result list are less in number than the threshold, indicating that a search request to the server system is unnecessary; and
upon determining that the search request to the server system is unnecessary, displaying at least one result from the result list cached in the memory of the client system that match the partial query.

16. The computer readable medium of claim 15, wherein the instructions when executed by the processor cause the computer system further to:

upon clicking on a non-functional search button, visually indicate the clicking without invoking a search.

17. The computer readable medium of claim 15, wherein determining whether a search request to the server system is unnecessary further comprises:
   upon determining that a cached search string is a prefix of a current search string, determine if the cached search string is identical to the current search string, and
   upon determining that the cached search string is identical to the current search string, indicating that a search request to the server system is unnecessary.

18. The computer readable medium of claim 15, wherein determining whether a search request to the server is unnecessary further comprises:
   upon determining that the results of the cached result list are less in number than the threshold, indicate that a search request to the server system is unnecessary.

19. The computer readable medium of claim 15, wherein determining whether a search request to the server system is unnecessary further comprises:
   upon determining that a cached search string is a prefix of a current search string, and that the cached search string is different from the current search string, and that results of the cached result list are not less than a predefined threshold, determine if a prefix of a last cached result is alphabetically after the current search string, and
   upon determining that the prefix of the last cached result is alphabetically after the current search string, indicating that a search request to the server system is unnecessary.

20. The computer readable medium of claim 15, wherein the instructions when executed by the processor cause the computer system further to:
   receiving a late response to a search request including a result list determined based on the search request, wherein results of the result list more than results of the cached result list, and
   upon determining that the received result list prevents a search request from the client system to the server system, overwriting the cached result list with the received result list.

* * * * *